United States Patent
Kang et al.

(10) Patent No.: US 11,616,241 B2
(45) Date of Patent: Mar. 28, 2023

(54) FUEL CELL COOLING SYSTEM AND CONTROL METHOD OF THE SAME

(71) Applicants: Hyundai Motor Company, Seoul (KR); Kia Motors Corporation, Seoul (KR)

(72) Inventors: Jung Tak Kang, Gyeonggi-do (KR); Yong Doo Son, Incheon (KR); Jun Seok Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 421 days.

(21) Appl. No.: 16/994,736

(22) Filed: Aug. 17, 2020

(65) Prior Publication Data

US 2021/0257632 A1 Aug. 19, 2021

(30) Foreign Application Priority Data

Feb. 19, 2020 (KR) ........................ 10-2020-0020063

(51) Int. Cl.
*H01M 8/04007* (2016.01)
*H01M 8/04029* (2016.01)

(52) U.S. Cl.
CPC ... *H01M 8/04074* (2013.01); *H01M 8/04029* (2013.01); *H01M 2250/20* (2013.01)

(58) Field of Classification Search
CPC ......... H01M 8/04029; H01M 8/04358; H01M 8/04723; H01M 8/04992
See application file for complete search history.

(56) References Cited

U.S. PATENT DOCUMENTS

2010/0227239 A1* 9/2010 Nitta ................. H01M 8/04029
429/437
2017/0256804 A1* 9/2017 Miller ............... H01M 8/04753

FOREIGN PATENT DOCUMENTS

DE 102016110964 * 12/2017

OTHER PUBLICATIONS

DE102016110964 English translation. Hable et al. Germany. Dec. 21, 2017. (Year: 2017).*

* cited by examiner

*Primary Examiner* — Christopher P Domone
(74) *Attorney, Agent, or Firm* — Fox Rothschild LLP

(57) ABSTRACT

A fuel cell cooling system and a control method are provided. The fuel cell cooling system includes a fuel cell module having a fuel cell stack and a first cooling water line through which primary cooling water undergoing heat exchange with the fuel cell stack to adjust a temperature of the fuel cell stack circulates. A cooling module includes a second cooling water line through which secondary cooling water circulates and a cooling tower is configured to adjust a temperature of the secondary cooling water. A heat exchanger is connected between the first cooling water line of the fuel cell module and the second cooling water line of the cooling module for heat exchange. A controller configured to operate the fuel cell module and the cooling module.

14 Claims, 2 Drawing Sheets

FUEL CELL COOLING SYSTEM AND CONTROL METHOD OF THE SAME

CROSS REFERENCE TO RELATED APPLICATION

The present application claims priority of Korean Patent Application No. 10-2020-0020063 filed on Feb. 19, 2020, the entire contents of which is incorporated herein for all purposes by this reference.

BACKGROUND

Field of the Disclosure

The present disclosure relates to a fuel cell cooling system for variably executing an operating mode of a fuel cell cooling system based on a temperature of cooling water and a rate of change in temperature increase, and a control method thereof.

Description of the Related Art

Fuel cells, which are energy converters for generating power through electrochemical reaction using hydrogen as fuel and oxygen as an oxidant, are being developed as next-generation energy sources in various technical fields. A fuel cell stack is varied in heating value according to a load and thus, to maintain an operating temperature constant, it is necessary to operate a cooling module. In particular, when a load of a vehicle fuel cell is varied, thermal management is important due to being directly related to performance and durability. A cooling system of a fuel cell includes a primary cooling water for directly removing heat generated in the fuel cell stack, and a secondary cooling water for removing heat transferred to the primary cooling water.

Since the primary cooling water directly affects temperatures of an inlet and an outlet of the fuel cell stack, temperature control of the primary cooling water has an important effect on an entirety of an operation of the cooling system. In particular, since the fuel cell has a relatively low operating temperature compared to those of other systems and hundreds of unit cells are stacked in series in the fuel cell, an allowable difference in temperature between the inlet and the outlet of the cooling water is minimal. Further, the secondary cooling water should be capable of effectively removing heat transferred to the primary cooling water.

The existing fuel cell cooling system is operated by monitoring a temperature of cooling water and then, when a temperature reaches a specific temperature, interrupting an operation of the cooling system. Accordingly, there is a limitation in that power generation is not efficient since the cooling system is not actively operated according to a situation.

SUMMARY

Accordingly, the present disclosure provides a fuel cell cooling system capable of measuring a temperature of primary cooling water circulating through a fuel cell module and operating a cooling system based on the temperature of the primary cooling water or a rate of change in temperature increase, and a control method thereof.

According to one aspect, a fuel cell cooling system may include a fuel cell module having a fuel cell stack and a first cooling water line through which primary cooling water undergoing heat exchange with the fuel cell stack to adjust a temperature of the fuel cell stack circulates; a cooling module having a second cooling water line through which secondary cooling water circulates and a cooling tower configured to adjust a temperature of the secondary cooling water; a heat exchanger connected between the first cooling water line of the fuel cell module and the second cooling water line of the cooling module and in which the primary cooling water and the secondary cooling water exchange heat; and a controller configured to operate the fuel cell module and the cooling module and determine the temperature of the primary cooling water as satisfying an emergency operating condition to operate the fuel cell module and the cooling module in an emergency operating mode, thereby cooling the primary cooling water.

In the emergency operating mode, the controller may be configured to reduce an output load amount of the fuel cell module and operate the cooling module maximally. Additionally, the fuel cell cooling system may further include a temperature sensor mounted in the first cooling water line of the fuel cell module and configured to measure the temperature of the primary cooling water, and the controller may be configured to determine whether the temperature of the primary cooling water measured by the temperature sensor satisfies the emergency operating condition and, when the emergency operating condition is satisfied, the controller may be configured to operate the fuel cell module and the cooling module in the emergency operating mode.

The temperature sensor may include a first temperature sensor mounted between the fuel cell stack and the heat exchanger and configured to measure a temperature of the primary cooling water discharged from the fuel cell stack, and a second temperature sensor mounted between the heat exchanger and the fuel cell stack and configured to measure a temperature of the primary cooling water introduced into the fuel cell stack. The controller may be configured to operate the fuel cell module and the cooling module based on the temperature of the primary cooling water measured by the second temperature sensor.

Further, the controller may be configured to operate the fuel cell module and the cooling module based on a difference between the temperatures of the primary cooling water measured by the first temperature sensor and the second temperature sensor. When the temperature of the primary cooling water is greater than or equal to about 65° C., the controller may be configured to determine that the emergency operating condition is satisfied. When a rate of change in temperature increase measured by the temperature sensor exceeds a rate of change in allowable driving temperature, the controller may be configured to determine that the emergency operating condition is satisfied. The rate of change in allowable driving temperature may be about 10° C./min.

Additionally, the fuel cell module may include a first cooling water pump configured to adjust a flow rate of the primary cooling water circulating through the first cooling water line, and the cooling module may include a second cooling water pump configured to adjust a flow rate of the secondary cooling water circulating through the second cooling water line. The controller may be configured to adjust the flow rates of the primary cooling water and the secondary cooling water by operating the first cooling water pump and the second cooling water pump. When the fuel cell module and the cooling module are operated in the emergency operating mode, the controller may be configured to maximally operate the second cooling water pump to cool the primary cooling water.

According to another aspect, a method of controlling the above-described fuel cell cooling system may include operating the fuel cell stack to generate power; measuring a temperature of primary cooling water and determining whether the temperature of the primary cooling water is within a normal operating temperature range; when the temperature of the primary cooling water is out of (e.g. beyond) the normal operating temperature range, operating the fuel cell cooling system in an emergency operating mode; measuring the temperature of the primary cooling water and determining whether the temperature of the primary cooling water is within an emergency operating temperature range; and when the temperature of the primary cooling water is out of (e.g. beyond) the emergency operating temperature range, determining whether the temperature of the primary cooling water is within an operating interruption temperature range and operating the fuel cell cooling system in a nominal operating mode or in an operating interruption mode.

The method may further include, when the fuel cell cooling system is operated in the emergency operating mode, reducing a load of a fuel cell stack and maximally operating a cooling module. Further, the nominal operating temperature range of the primary cooling water may be set to be less than or equal to about 45° C.; the emergency operating temperature range of the primary cooling water may be set to exceed about 45° C. and to be less than about 70° C.; and the operating interruption temperature range of the primary cooling water may be set to exceed about 70° C. When whether the temperature of the primary cooling water is within the normal operating temperature range is determined and a rate of change in temperature increase of the primary cooling water is greater than or equal to about 10° C./min, the temperature of the primary cooling water may be determined as being out of (e.g., beyond) the normal operating temperature range.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
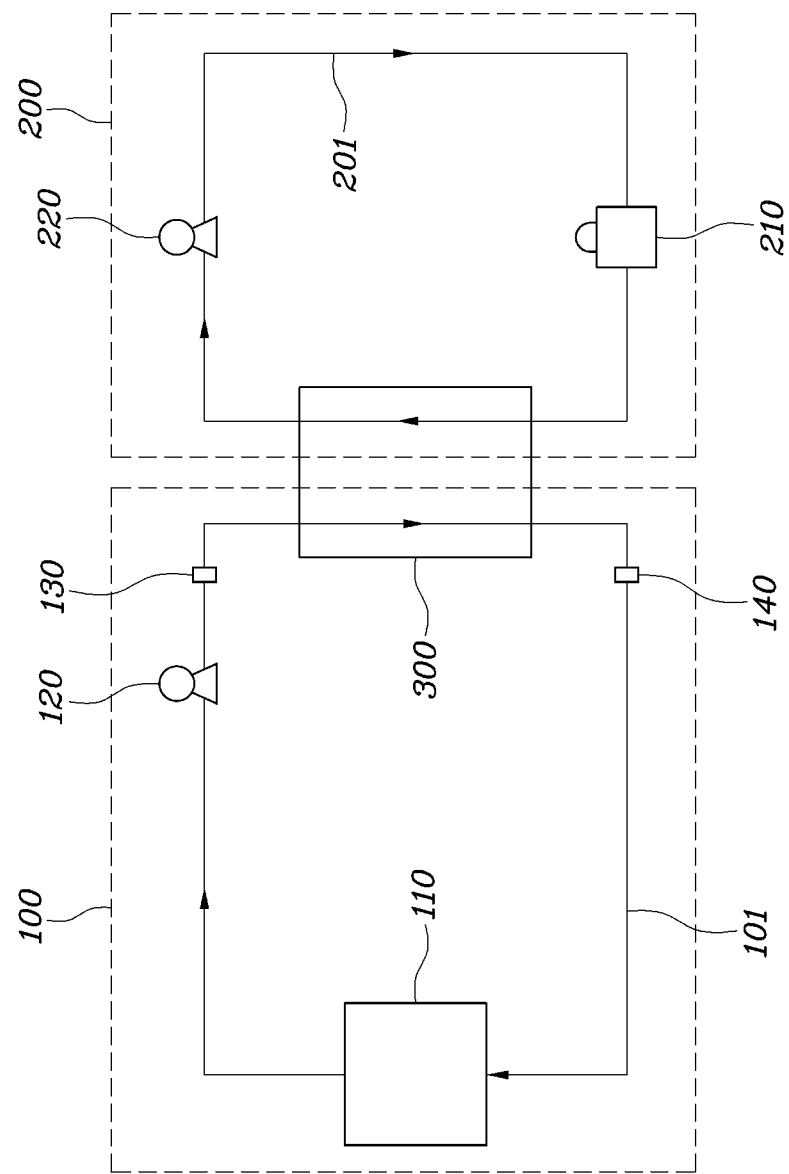
FIG. 1 is a block diagram illustrating a fuel cell cooling system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present disclosure disclosed in this disclosure or application are illustrative only for the purpose of describing the exemplary embodiments, and the exemplary embodiments according to the present disclosure may be implemented in various forms and should not be construed as being limited to exemplary embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the exemplary embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

Hereinafter, exemplary embodiments of the present disclosure will be described in detail with reference to the accompanying drawings. Like reference numerals denote like members throughout the drawings. The present disclosure relates to a fuel cell cooling system for cooling a fuel cell and a control method thereof, which are capable of improving efficiency of the fuel cell through optimization of a cooling system by monitoring a temperature of primary cooling water which cools a fuel cell stack 110 and operating a cooling module 200 in advance before an operating interruption situation occurs.

FIG. 1 is a block diagram illustrating a fuel cell cooling system according to an exemplary embodiment of the present disclosure. Referring to FIG. 1, a fuel cell cooling system according to an exemplary embodiment of the present disclosure may include a fuel cell module 100, the cooling module 200, a heat exchanger 300, and a controller (not shown). The controller may be configured to operate the various components of the system.

In particular, the fuel cell module 100 may include the fuel cell stack 110, a first cooling water line 101, and a first cooling water pump 120. The fuel cell stack 110 produces electrical energy by electrochemically reacting hydrogen and oxygen and the related technology is a well-known technology, and thus a detailed description thereof will be omitted herein. The first cooling water line 101 is a line through which primary cooling water undergoing heat exchange with the fuel cell stack 110 to cool the fuel cell stack 110 circulates. The fuel cell stack 110 may be heat-exchangeably connected to the first cooling water line 101, and the first cooling water line 101 may have a closed circulation structure to allow the primary cooling water to circulate.

The cooling module 200 may include a second cooling water line 201, a cooling tower 210, and a second cooling water pump 220. Secondary cooling water may circulate through the second cooling water line 201. The secondary cooling water may undergo heat exchange with the fuel cell stack 110 through the heat exchanger 300, which will be described below, and cool the heated primary cooling water. The cooling tower 210 may be configured to adjust a temperature of the secondary cooling water by preforming heat exchange with the primary cooling water to cool the heated secondary cooling water. After undergoing heat exchange with the primary cooling water, the secondary cooling water may be cooled by the cooling tower 210 and then may circulate to the heat exchanger 300 again.

The first cooling water pump 120 may be configured to adjust a flow rate of the primary cooling water circulating through the first cooling water line 101, and the second cooling water pump 220 may be configured to adjust a flow rate of the secondary cooling water circulating through the second cooling water line 201. The controller may be configured to operate the first cooling water pump 120 and the second cooling water pump 220 to adjust the flow rates of the first cooling water line 101 and the second cooling water line 201, thereby cooling the fuel cell stack 110.

The heat exchanger 300 may be connected between the first cooling water line 101 and the second cooling water line 201 and the primary cooling water and the secondary cooling water may exchange heat in the heat exchanger 300. Heat generated in the fuel cell stack 110 may be transferred to the primary cooling water through heat exchange between the fuel cell stack 110 and the primary cooling water, and the heat of the primary cooling water may be exchanged with the secondary cooling water in the heat exchanger 300 to be transferred to the secondary cooling water.

The controller may be configured to operate the fuel cell module 100 and the cooling module 200. In particular, the controller may be configured to operate the fuel cell module 100 and the cooling module 200 to operate in a normal operating mode or an emergency operating mode based on the temperature of the primary cooling water and may interrupt the operations thereof as necessary. In response to determining that a temperature of the primary cooling water exceeds a predetermined normal operating temperature range, the controller may be configured to determine that the emergency operating condition is satisfied and operate the fuel cell module 100 and the cooling module 200 in the emergency operating mode. In the emergency operating mode, the controller may be configured to reduce an output load of the fuel cell module 100 to reduce a heating value of the fuel cell stack 110. Further, the controller may be configured to maximally operate the cooling module 200 to maximally cool the first cooling water line 101 to operate the cooling module 200 to maximally remove the heat generated in the fuel cell stack 110.

Further, the fuel cell cooling system according to an exemplary embodiment of the present disclosure may further include a temperature sensor configured to measure a temperature of the primary cooling water. The temperature sensor may be disposed on the first cooling water line 101 of the fuel cell module 100 and may be configured to measure the temperature of the primary cooling water, thereby monitoring the temperature of the primary cooling water.

Referring to FIG. 1, on the first cooling water line 101, the temperature sensor may include a first temperature sensor 130 mounted between the fuel cell stack 110 and the heat exchanger 300 and a second temperature sensor 140 mounted between the heat exchanger 300 and the fuel cell stack 110. In other words, the first temperature sensor 130 may be mounted at a position at which the primary cooling water is introduced into the heat exchanger 300, and the second temperature sensor 140 may be mounted at a position at which the primary cooling water is discharged from the heat exchanger 300. The first temperature sensor 130 may be configured to measure a temperature of the primary cooling water which undergoes heat exchange with the fuel cell stack 110 and before being introduced into the heat exchanger 300, and the second temperature sensor 140 may be configured to measure a temperature of the primary cooling water which undergoes heat exchange with the second cooling water line 201 in the heat exchanger 300 and before being introduced into the fuel cell stack 110.

When the temperature of the primary cooling water introduced into the fuel cell stack 110 is too high, since a polymer electrolyte of the fuel cell stack 110 is damaged and thus durability thereof is degraded, it is preferable that an operating mode of the fuel cell cooling system is set based on the temperature of the primary cooling water measured by the second temperature sensor 140. When the temperature of the primary cooling water measured by the second temperature sensor 140 is greater than or equal to a predetermined temperature, a load amount of the fuel cell stack 110 may be adjusted or the cooling module 200 may be operated to reduce the temperature of the primary cooling water.

In the fuel cell stack 110, a temperature difference between an inlet and an outlet of the fuel cell stack 110 should be maintained to be less than or equal to a predetermined temperature. Thus, the controller may be configured to operate the fuel cell module 100 and the cooling module 200 such that a difference between the temperatures of the primary cooling water measured by the first temperature sensor 130 and the second temperature sensor 140 is maintained to be less than or equal to the predetermined temperature. In other words, the emergency operating condition may be satisfied by the temperature of the primary cooling water, and also by a difference in temperature between the temperature of the primary cooling water introduced into the fuel cell stack 110 and the temperature of the primary cooling water discharged therefrom.

The controller may be configured to determine whether the temperature of the primary cooling water measured by the temperature sensor exceeds a predetermined normal operating temperature range, and, in response to determining that the temperature of the primary cooling water measured by the temperature sensor exceeds the normal operating temperature range, the controller may be configured to determine that the emergency operating condition is satisfied. When the emergency operating condition is satisfied, the controller may be configured to operate the fuel cell module 100 and the cooling module 200 in the emergency operating mode. The emergency operating condition may be variably set according to a load of the fuel cell stack 110. For example, when the temperature of the primary cooling water measured by the second temperature sensor 140 is greater than or equal to about 65° C., the controller may be configured to operate the fuel cell module 100 and the cooling module 200 in the emergency operating mode.

Alternatively, the controller may be configured to determine whether the emergency operating condition is satisfied by a current temperature of the primary cooling water, and also by a rate of change in temperature increase. Even though the emergency operating condition is not satisfied at a point of time of measuring the temperature of the primary cooling water, when the rate of change in temperature increase of the primary cooling water is excessive so that it is certain that the temperature of the primary cooling water exceeds an allowable temperature range, the controller may be configured to switch to the emergency operating mode in advance to secure stability and durability of the fuel cell cooling system. The rate of change in temperature rise may also be set variably. For example, a case in which a temperature increase exceeding about 10° C. per minute is measured may be set as the emergency operating condition.

When the controller determines the emergency operating condition as being satisfied to operate the fuel cell module 100 and the cooling module 200 in the emergency operating mode, the second cooling water pump 220 may be maximally operated. The second cooling water pump 220 may be maximally operated to increase a flow rate of the secondary cooling water circulating through the second cooling water line 201 to maximally reduce the temperature of the primary cooling water in the heat exchanger 300. When the fuel cell cooling system is operated in the emergency operating mode to reduce the temperature of the primary cooling water, and the temperature of the primary cooling water is measured by the temperature sensor as being within the normal operating temperature range, the controller may be configured to switch to the normal operating mode again to operate the fuel cell cooling system in the normal operating mode.

As described above, unlike the related art, the fuel cell cooling system according to an exemplary embodiment of the present disclosure may be configured to measure the temperature of the primary cooling water circulating through the fuel cell module 100 and respond to an overload of the fuel cell cooling system in advance based on the measured temperature of the primary cooling water, thereby having a technical effect which is capable of efficiently generating power. The operating mode may be switched to the emergency operating mode based on the temperature of the primary cooling water as well as the rate of change in temperature increase so that it is possible to stably operate the fuel cell cooling system by responding in advance before an emergency situation occurs.

Figure 2:
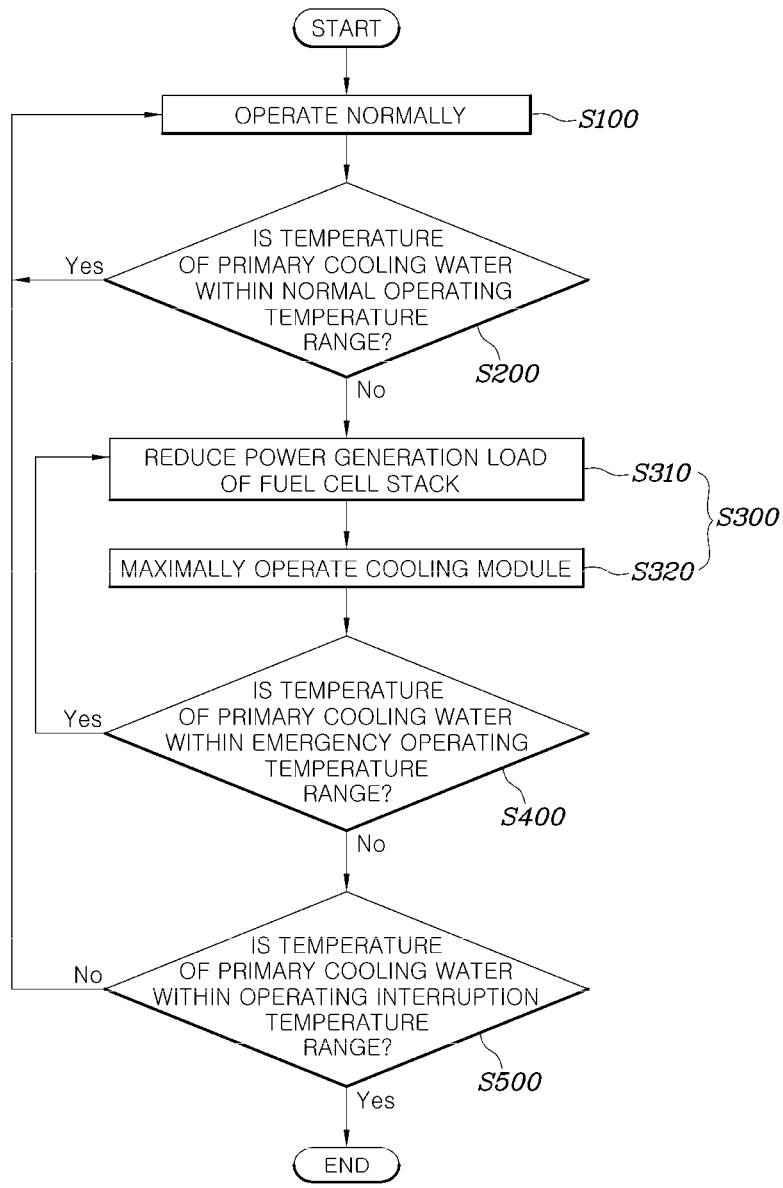
FIG. 2 is a flowchart illustrating a method of controlling a fuel cell cooling system according to an exemplary embodiment of the present disclosure.

FIG. 2 is a flowchart illustrating a method of controlling a fuel cell cooling system according to an exemplary embodiment of the present disclosure. The method of controlling a fuel cell cooling system according to an exemplary embodiment of the present disclosure will be described below with reference to FIG. 2. Notably, the method described herein below may be executed by the controller.

In operation S100 of operating the fuel cell stack 110 to generate power, a heating value is increased as power is generated. The primary cooling water circulating through the first cooling water line 101 continuously undergoes heat exchange with the fuel cell stack 110 to cool the fuel cell stack 110. In operation S200, a temperature of the primary cooling water may be measured while the fuel cell stack 110 operates, and the temperature of the primary cooling water may be continuously monitored to determine whether the temperature of the primary cooling water is within a normal operating temperature range. A normal operating temperature refers to a temperature of the primary cooling water at which the fuel cell cooling system may operate in a normal operating mode. In the normal operating mode, since the temperature of the first cooling water also increases when a heating value of the fuel cell stack 110 is gradually increased, the temperature of the primary cooling water may be continuously measured to check stability of the fuel cell cooling system.

When the measured temperature of the primary cooling water is out of (e.g., beyond) the normal operating temperature range, operation S300 of operating the fuel cell cooling system in an emergency operating mode may be started. Operation S300 of operating the fuel cell cooling system in the emergency operating mode includes operation S310 of reducing a power generation load of the fuel cell stack 110 to decrease the heating value, and operation S320 of maximally operating the cooling module 200 to reduce the temperature of the primary cooling water. In operation S400, the temperature of the primary cooling water may be measured while the fuel cell cooling system is operated in the emergency operating mode, and whether the temperature of the primary cooling water is within an emergency operating temperature range is determined. The emergency operating temperature range should be set to exceed the normal operating temperature range. In response to determining that the measured temperature of the primary cooling water is within the emergency operating temperature range, the fuel cell cooling system may be continuously operated in the emergency operating mode (S300) to reduce the temperature of the primary cooling water. Therefore, in operation S300 of operating the fuel cell cooling system in the emergency operating mode, the temperature of the primary cooling water has a value within the emergency operating temperature range.

In response to determining that the temperature of the primary cooling water is out of or beyond the emergency operating temperature range, whether the temperature of the primary cooling water is within an operating interruption temperature range may be determined (S500). The operating interruption temperature range should be set to exceed the emergency operating temperature range. In response to determining that the measured temperature of the primary cooling water is within the operating interruption temperature range, the operation of the fuel cell cooling system may be interrupted. The temperature of the primary cooling water being within the operating interruption temperature range indicates that, even though the cooling module 200 is maximally operated, the temperature of the primary cooling water is unable to be reduced.

However, when the temperature of the primary cooling water is out of or beyond the operating interruption temperature range, the fuel cell cooling system may be operated in a normal operation mode since the temperature of the primary cooling water is within the normal operating temperature range instead of the emergency operating temperature range or the operating interruption temperature range.

This is a result of cooling the primary cooling water in operation S300 of operating the fuel cell cooling system in the emergency operating mode. The normal operating temperature range, the emergency operating temperature range, and the operating interruption temperature range may be set appropriately. For example, the normal operating temperature range of the primary cooling water may be set to be less than or equal to about 45° C., the emergency operating temperature range thereof may be set to exceed about 45° C. and to be less than about 70° C., and the operating interruption temperature range thereof may be set to exceed about 70° C.

In particular, in operation S100 of operating the fuel cell stack 110 to generate the power, the fuel cell cooling system may be operated in the normal operation mode and thus the temperature of the primary cooling water gradually increase, and the fuel cell cooling system may be operated in the normal operation mode to a temperature of about 45° C. that is within the normal operating temperature range. When the temperature of the primary cooling water continuously increases to be within the emergency operating temperature range exceeding about 45° C. and less than about 70° C., operation S300 of operating the fuel cell cooling system in the emergency operating mode may be performed to cool the primary cooling water.

The temperature of the primary cooling water may be continuously measured in the emergency operating mode, and, when the temperature of the primary cooling water is reduced again to the normal operating temperature range, the fuel cell cooling system may be operated in the normal operating mode, and, when the temperature of the primary cooling water exceeds about 70° C. that is the operating interruption temperature range, the operation of the fuel cell cooling system may be interrupted. Alternatively, when whether the temperature of the primary cooling water is within the normal operating temperature range is determined, it may be determined with the rate of change in temperature increase of the primary cooling water. When the rate of change in temperature increase of the primary cooling water is greater than or equal to about 10° C./min, the temperature of the primary cooling water may be determined as not being within the normal operating temperature range so that operation S300 of operating the fuel cell cooling system in the emergency operating mode may be performed.

The fuel cell cooling system according to an exemplary embodiment of the present disclosure may be operated in the normal operation mode or the emergency operating mode or may be interrupted according to the temperature of the primary cooling water so that efficient control is possible. Therefore, the fuel cell cooling system according to an exemplary embodiment of the present disclosure may be differentiated from the conventional technology which interrupts an entirety of the operation of the fuel cell cooling system when a temperature exceeds a predetermined reference temperature and may have an advantage which is capable of more stably generating power.

In accordance with the present disclosure, a fuel cell cooling system may be operated based on a temperature of primary cooling water for cooling a fuel cell module and a rate of change in temperature increase to appropriately operate the fuel cell cooling system according to a situation such that there is an advantage which is capable of efficiently operating the fuel cell cooling system. Further, there is an advantage in that the fuel cell cooling system may be operated to allow stable power generation by responding in advance to whether abnormality in the fuel cell cooling system occurs.

Although specific exemplary embodiments of the present disclosure has been described and illustrated, those skilled in the art will appreciate that various alternations and modifications are possible without departing from the technical spirit of the present disclosure as disclosed in the appended claims.

What is claimed is:

1. A fuel cell cooling system, comprising:
    a fuel cell module including a fuel cell stack and a first cooling water line through which primary cooling water undergoing heat exchange with the fuel cell stack to adjust a temperature of the fuel cell stack circulates;
    a cooling module including a second cooling water line through which secondary cooling water circulates and a cooling tower configured to adjust a temperature of the secondary cooling water;
    a heat exchanger connected between the first cooling water line of the fuel cell module and the second cooling water line of the cooling module and in which the primary cooling water and the secondary cooling water exchange heat; and
    a controller configured to operate the fuel cell module and the cooling module and determine the temperature of the primary cooling water as satisfying an emergency operating condition to operate the fuel cell module and the cooling module in an emergency operating mode to cool the primary cooling water.

2. The fuel cell cooling system of claim 1, wherein, in case of the emergency operating mode, the controller is configured to reduce a output load amount of the fuel cell module and operate the cooling module maximally.

3. The fuel cell cooling system of claim 1, further comprising:
    a temperature sensor mounted in the first cooling water line of the fuel cell module and configured to measure the temperature of the primary cooling water,
    wherein the controller is configured to determine whether the temperature of the primary cooling water measured by the temperature sensor satisfies the emergency operating condition and, in response to determining that the emergency operating condition is satisfied, operate the fuel cell module and the cooling module in the emergency operating mode.

4. The fuel cell cooling system of claim 3, wherein:
    the temperature sensor includes a first temperature sensor mounted between the fuel cell stack and the heat exchanger and configured to measure a temperature of the primary cooling water discharged from the fuel cell stack, and a second temperature sensor mounted between the heat exchanger and the fuel cell stack and configured to measure a temperature of the primary cooling water introduced into the fuel cell stack; and
    the controller is configured to operate the fuel cell module and the cooling module based on the temperature of the primary cooling water measured by the second temperature sensor.

5. The fuel cell cooling system of claim 3, wherein:
    the temperature sensor includes a first temperature sensor mounted between the fuel cell stack and the heat exchanger and configured to measure a temperature of the primary cooling water discharged from the fuel cell stack, and a second temperature sensor mounted between the heat exchanger and the fuel cell stack and configured to measure a temperature of the primary cooling water introduced into the fuel cell stack; and
    the controller is configured to operate the fuel cell module and the cooling module based on a difference between the temperatures of the primary cooling water measured by the first temperature sensor and the second temperature sensor.

6. The fuel cell cooling system of claim 3, wherein, in response to determining that the temperature of the primary cooling water is greater than or equal to about 65° C., the controller is configured to determine that the emergency operating condition is satisfied.

7. The fuel cell cooling system of claim 3, wherein, in response to determining that a rate of change in temperature increase measured by the temperature sensor exceeds a rate of change in allowable driving temperature, the controller is configured to determine that the emergency operating condition is satisfied.

8. The fuel cell cooling system of claim 7, wherein the rate of change in allowable driving temperature is about 10° C./min.

9. The fuel cell cooling system of claim 1, wherein:
the fuel cell module includes a first cooling water pump configured to adjust a flow rate of the primary cooling water circulating through the first cooling water line, and the cooling module includes a second cooling water pump configured to adjust a flow rate of the secondary cooling water circulating through the second cooling water line; and
the controller is configured to adjust the flow rates of the primary cooling water and the secondary cooling water by operating the first cooling water pump and the second cooling water pump.

10. The fuel cell cooling system of claim 9, wherein, when the fuel cell module and the cooling module are operated in the emergency operating mode, the controller is configured to maximally operate the second cooling water pump to cool the primary cooling water.

11. A method of controlling the fuel cell cooling system according to claim 1, comprising:
operating, by a controller, the fuel cell stack to generate power;
measuring, by the controller, a temperature of primary cooling water and determining whether the temperature of the primary cooling water is within a normal operating temperature range;
in response to determining that the temperature of the primary cooling water is out of the normal operating temperature range, operating, by the controller, the fuel cell cooling system in an emergency operating mode;
measuring, by the controller, the temperature of the primary cooling water and determining whether the temperature of the primary cooling water is within an emergency operating temperature range; and
in response to determining that the temperature of the primary cooling water is out of the emergency operating temperature range, determining, by the controller, whether the temperature of the primary cooling water is within an operating interruption temperature range and operating the fuel cell cooling system in a normal operating mode or in an operating interruption mode.

12. The method of claim 11, further comprising:
when the fuel cell cooling system is operated in the emergency operating mode, reducing, by the controller, a load of a fuel cell stack and maximally operating a cooling module.

13. The method of claim 11, wherein:
the normal operating temperature range of the primary cooling water is set to be less than or equal to about 45° C.;
the emergency operating temperature range of the primary cooling water is set to exceed about 45° C. and to be less than about 70° C.; and
the operating interruption temperature range of the primary cooling water is set to exceed about 70° C.

14. The method of claim 11, when a rate of change in temperature increase of the primary cooling water is greater than or equal to about 10° C./min, the temperature of the primary cooling water is determined as being out of the normal operating temperature range.

* * * * *